United States Patent
Larmuseau et al.

(10) Patent No.: US 11,917,553 B2
(45) Date of Patent: Feb. 27, 2024

(54) ELEVATOR CALLING SYSTEM HAVING ADJUSTABLE ELEVATOR CALLING DISTANCE

(71) Applicant: Otis Elevator Company, Farmington, CT (US)

(72) Inventors: Adriaan Joris H. Larmuseau, Shanghai (CN); Changle Li, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1469 days.

(21) Appl. No.: 16/227,766

(22) Filed: Dec. 20, 2018

(65) Prior Publication Data
US 2019/0185291 A1    Jun. 20, 2019

(30) Foreign Application Priority Data
Dec. 20, 2017    (CN) .......................... 201711382772.6

(51) Int. Cl.
*B66B 1/34* (2006.01)
*B66B 1/46* (2006.01)
(Continued)

(52) U.S. Cl.
CPC .......... *H04W 52/283* (2013.01); *B66B 1/468* (2013.01); *H04W 52/383* (2013.01); *B66B 2201/4653* (2013.01)

(58) Field of Classification Search
CPC .......... B66B 1/34–3415; B66B 1/3446–3476; B66B 1/468; B66B 5/00–0018; B66B 2201/4638; B66B 2201/4653
See application file for complete search history.

(56) References Cited

U.S. PATENT DOCUMENTS

| | | |
|---|---|---|
| 6,397,976 B1 | 6/2002 | Hale et al. |
| 7,552,800 B2 | 6/2009 | Puskala et al. |

(Continued)

FOREIGN PATENT DOCUMENTS

| | | |
|---|---|---|
| CN | 104276462 A | 1/2015 |
| CN | 104760851 A | 7/2015 |

(Continued)

OTHER PUBLICATIONS

Garfield, Leanna, "This app lets you open doors and summon elevators with your phone", Business Insider India, May 19, 2016, 5 pages.

(Continued)

*Primary Examiner* — Christopher Uhlir
(74) *Attorney, Agent, or Firm* — CANTOR COLBURN LLP

(57) ABSTRACT

The present invention provides an automatic elevator-calling system and an automatic elevator-calling control method, belonging to the technical field of elevator intelligent control technologies. The automatic elevator-calling system and the automatic elevator-calling control method of the present invention can configure an elevator calling distance in an adjustable manner, wherein the elevator calling distance indicates a distance between a personal mobile terminal that can sense a wireless signal and a wireless signal apparatus when the personal mobile terminal automatically sends an elevator calling request command. The present invention can further improve the elevator calling experience of the passenger.

17 Claims, 5 Drawing Sheets

(51) Int. Cl.
*H04W 52/28* (2009.01)
*H04W 52/38* (2009.01)

(56) References Cited

U.S. PATENT DOCUMENTS

| | | |
|---|---|---|
| 8,651,242 B2 | 2/2014 | Sarjanen et al. |
| 9,469,500 B2 | 10/2016 | Friedli |
| 2007/0041352 A1 | 2/2007 | Frankel et al. |
| 2015/0075914 A1 | 3/2015 | Armistead et al. |
| 2015/0291388 A1 | 10/2015 | Hovi et al. |
| 2016/0031675 A1 | 2/2016 | Silvennoinen et al. |
| 2016/0090270 A1 | 3/2016 | Wang |
| 2016/0122157 A1 | 5/2016 | Keser |
| 2016/0207735 A1 | 7/2016 | Elomaa et al. |
| 2016/0368732 A1 | 12/2016 | Zhao et al. |
| 2017/0057781 A1 | 3/2017 | Depaola |

FOREIGN PATENT DOCUMENTS

| | | |
|---|---|---|
| CN | 104192653 B | 3/2016 |
| CN | 106144805 A | 11/2016 |
| CN | 205772540 U | 12/2016 |
| CN | 106946108 A | 7/2017 |
| WO | 2012093985 A1 | 7/2012 |
| WO | 2014178790 A1 | 11/2014 |
| WO | 2016100293 A1 | 6/2016 |
| WO | 2016188552 A1 | 12/2016 |
| WO | 2017175021 A1 | 10/2017 |

OTHER PUBLICATIONS

Kwon, Ohhoon, et al., "Sensor-aware elevator scheduling for smart building", abstract, Building and Environment, vol. 72, Feb. 2014, 2 pages.
European Search Report for application EP 18214248.9, dated Sep. 26, 2019, 61 pages.

ELEVATOR CALLING SYSTEM HAVING ADJUSTABLE ELEVATOR CALLING DISTANCE

FOREIGN PRIORITY

This application claims priority to Chinese Patent Application No. 201711382772.6, filed Dec. 20, 2017, and all the benefits accruing therefrom under 35 U.S.C. § 119, the contents of which in its entirety are herein incorporated by reference.

TECHNICAL FIELD

The present invention belongs to the field of elevator intelligent control technologies, relating to an automatic elevator-calling system and an automatic elevator-calling control method which can automatically complete an elevator calling request operation.

BACKGROUND ART

In an existing elevator system, a common operation mode of elevator calling is: a passenger manually presses a certain elevator calling button on an elevator calling request input device mounted in an elevator landing area to input an elevator calling request command for traveling upward or traveling downward, and then enters a certain elevator car. Such an elevator calling request operation mode needs to be completed through a manual operation; moreover, especially when both hands of the passenger are incapable of performing the button pressing operations freely (for example, the passenger is carrying stuff with both hands, or a passenger having difficulties in walking is sitting in a wheelchair), the elevator calling request operation becomes difficult, affecting the experience of the passenger.

SUMMARY OF INVENTION

The object of the present invention is at least to improve the elevator calling experience of the passenger.

In order to realize the above objects or other objects, the following technical solutions are provided in the present invention.

According to a first aspect of the present invention, provided is an automatic elevator-calling system, comprising: a wireless signal apparatus mounted in an elevator landing area of an elevator system and broadcasting a corresponding wireless signal to the surroundings, wherein the automatic elevator-calling system senses the wireless signal via a personal mobile terminal carried by a passenger and automatically sends an elevator calling request command to the wireless signal apparatus when a distance between the personal mobile terminal and the wireless signal apparatus is smaller than or equal to an elevator calling distance; and wherein the automatic elevator-calling system can configure the elevator calling distance in an adjustable manner through the wireless signal apparatus and/or the personal mobile terminal.

The automatic elevator-calling system according to one embodiment of the present invention, wherein the wireless signal apparatus is configured to adjust and configure the elevator calling distance according to a car traveling distance for a corresponding elevator car to travel to a landing where the wireless signal apparatus is located.

The automatic elevator-calling system according to one embodiment of the present invention, wherein the wireless signal apparatus is configured to adjust and configure the signal strength of the wireless signal broadcast thereby according to the car traveling distance for the corresponding elevator car to travel to the landing where the wireless signal apparatus is located.

The automatic elevator-calling system according to one embodiment of the present invention, wherein the wireless signal apparatus is configured to enable the signal strength of the wireless signal broadcast thereby to be smaller when the car traveling distance is shorter.

The automatic elevator-calling system according to one embodiment of the present invention, wherein the automatic elevator-calling system is further used for adjusting and configuring the elevator-calling distance according to a movement speed of the passenger carrying the personal mobile terminal.

The automatic elevator-calling system according to one embodiment of the present invention, wherein the automatic elevator-calling system is further used for determining the movement speed according to at least one of the following: passenger movement speed input, passenger age, passenger height, statistic information about the passenger movement speed, statistic information about historical passenger movement speed.

The automatic elevator-calling system according to one embodiment of the present invention, wherein the automatic elevator-calling system is further used for approximately determining the distance between the personal mobile terminal and the wireless signal apparatus according to the signal strength of the wireless signal sensed thereby.

The automatic elevator-calling system according to one embodiment of the present invention, wherein the automatic elevator-calling system is further used for automatically sending an elevator calling request command to the wireless signal apparatus when the signal strength of the sensed wireless signal is equal to or greater than a corresponding trigger threshold strength.

The automatic elevator-calling system according to one embodiment of the present invention, wherein the automatic elevator-calling system is further used for adjusting and configuring the corresponding trigger threshold strength according to a movement speed of the passenger carrying the personal mobile terminal.

The automatic elevator-calling system according to one embodiment of the present invention, wherein the automatic elevator-calling system is further used for receiving the trigger threshold strength or the elevator calling distance input from the personal mobile terminal.

The automatic elevator-calling system according to one embodiment of the present invention, wherein the wireless signal apparatus is a bluetooth module or a bluetooth low energy module.

According to a second aspect of the present invention, provided is a wireless signal apparatus. The wireless signal apparatus is mounted in an elevator landing area of an elevator system and broadcasts a corresponding wireless signal to the surroundings, wherein the wireless signal apparatus is configured to adjust and configure an elevator calling distance according to a car traveling distance for a corresponding elevator car to travel to a landing where the wireless signal apparatus is located, and the elevator calling distance indicates a distance between a personal mobile terminal that can sense the wireless signal and the wireless signal apparatus when the personal mobile terminal automatically sends an elevator calling request command.

The automatic elevator-calling system according to one embodiment of the present invention, wherein the wireless signal apparatus is configured to adjust and configure the signal strength of the wireless signal broadcast thereby according to the car traveling distance between the corresponding elevator car and the wireless signal apparatus.

The automatic elevator-calling system according to one embodiment of the present invention, wherein the wireless signal apparatus is configured to enable the signal strength of the wireless signal broadcast thereby to be smaller when the car traveling distance is shorter.

The automatic elevator-calling system according to one embodiment of the present invention, wherein the wireless signal apparatus is a bluetooth module or a bluetooth low energy module, and the wireless signal is a bluetooth signal or a bluetooth low energy signal.

According to a third aspect of the present invention, provided is an automatic elevator-calling control method, comprising: a step of adjusting and configuring an elevator calling distance, wherein the elevator calling distance indicates a distance between a personal mobile terminal and a wireless signal apparatus mounted in an elevator landing area of an elevator system when the personal mobile terminal automatically sends an elevator calling request command; and an elevator calling operation step: when the distance between the personal mobile terminal and the wireless signal apparatus is smaller than or equal to the configured elevator calling distance, an elevator calling operation of automatically sending and/or receiving an elevator calling request command is performed.

The automatic elevator-calling control method according to one embodiment of the present invention, wherein in the step of adjusting and configuring the elevator calling distance, the elevator calling distance is adjusted and configured according to a car traveling distance for a corresponding elevator car to travel to a landing where the wireless signal apparatus is located.

The automatic elevator-calling control method according to one embodiment of the present invention, wherein in the step of adjusting and configuring the elevator calling distance, the signal strength of the wireless signal broadcast by the wireless signal apparatus is adjusted and configured according to the car traveling distance for the corresponding elevator car to travel to the landing where the wireless signal apparatus is located.

The automatic elevator-calling control method according to one embodiment of the present invention, wherein in the step of adjusting and configuring the elevator calling distance, the signal strength of the wireless signal broadcast by the wireless signal apparatus is enabled to be smaller when the car traveling distance is shorter.

The automatic elevator-calling control method according to one embodiment of the present invention, wherein in the step of adjusting and configuring the elevator calling distance, the elevator-calling distance is adjusted and configured according to a movement speed of a passenger carrying the personal mobile terminal.

The automatic elevator-calling control method according to one embodiment of the present invention, wherein in the step of adjusting and configuring the elevator calling distance, the movement speed is determined according to at least one of the following: passenger movement speed input, passenger age, passenger height, statistic information about the passenger movement speed, statistic information about historical passenger movement speed.

The automatic elevator-calling control method according to one embodiment of the present invention, wherein the elevator calling operation step comprises: sensing a wireless signal broadcast by the wireless signal apparatus; and automatically sending an elevator calling request command to the wireless signal apparatus when the wireless signal is sensed.

The automatic elevator-calling control method according to one embodiment of the present invention, wherein the distance between the personal mobile terminal and the wireless signal apparatus is approximately determined according to the signal strength of the sensed wireless signal.

The automatic elevator-calling control method according to one embodiment of the present invention, wherein the elevator calling operation step comprises: determining the signal strength of the sensed wireless signal and judging whether the signal strength is equal to or greater than a corresponding trigger threshold strength; and automatically sending an elevator calling request command to the wireless signal apparatus when the signal strength of the sensed wireless signal is equal to or greater than the corresponding trigger threshold strength.

The automatic elevator-calling control method according to one embodiment of the present invention, wherein in the step of adjusting and configuring the elevator-calling distance, the corresponding trigger threshold strength is adjusted and configured according to a movement speed of the passenger carrying the personal mobile terminal.

The automatic elevator-calling control method according to one embodiment of the present invention, wherein the method further comprises a step of: receiving an input regarding the trigger threshold strength or the elevator calling distance.

According to a fourth aspect of the present invention, provided is a wireless signal apparatus comprising a memory, a processor and a computer program stored on the memory and capable of running on the processor, wherein the processor can implement the following steps while executing the program:

a step of adjusting and configuring an elevator calling distance, wherein the elevator calling distance indicates a distance between a personal mobile terminal and a wireless signal apparatus mounted in an elevator landing area of an elevator system when the personal mobile terminal automatically sends an elevator calling request command; and an elevator calling operation step: when the distance between the personal mobile terminal and the wireless signal apparatus is smaller than or equal to the elevator calling distance, an elevator calling operation of receiving the elevator calling request command is performed.

According to a fifth aspect of the present invention, provided is a computer readable storage medium with a computer program stored thereon, wherein the program can be executed by a processor to implement the steps of any automatic elevator-calling control method mentioned above.

According to a sixth aspect of the present invention, provided is an elevator system, comprising: an automatic elevator-calling system as claimed in any one of the above-mentioned embodiments; and an elevator controller for controlling the running of one or more elevator cars in the elevator system, wherein the elevator controller is coupled with the wireless signal apparatus and at least controls the running of one or more elevator cars in the elevator system in response to the elevator calling request command.

According to a seventh aspect of the present invention, provided is a personal mobile terminal configured to be able to receive a wireless signal broadcast by a wireless signal apparatus mounted in an elevator landing area of an elevator system; the personal mobile terminal is further configured to adjust and configure an elevator calling distance, and the elevator calling distance indicates a corresponding distance between the personal mobile terminal and the wireless signal apparatus when the personal mobile terminal automatically sends an elevator calling request command.

The personal mobile terminal according to one embodiment of the present invention, wherein the personal mobile terminal is further configured to adjust and configure the elevator calling distance according to a movement speed of the passenger carrying the personal mobile terminal.

The personal mobile terminal according to one embodiment of the present invention, wherein the personal mobile terminal is further configured to determine the movement speed according to at least one of the following: passenger movement speed input, passenger age, passenger height, statistic information about the passenger movement speed, statistic information about historical passenger movement speed.

The personal mobile terminal according to one embodiment of the present invention, wherein the personal mobile terminal is further configured to automatically send an elevator calling request command to the wireless signal apparatus when the wireless signal is sensed.

The personal mobile terminal according to one embodiment of the present invention, wherein the personal mobile terminal is further configured to approximately determine a distance between the personal mobile terminal and the wireless signal apparatus according to the signal strength of the wireless signal sensed thereby.

The personal mobile terminal according to one embodiment of the present invention, wherein the personal mobile terminal is further configured to automatically send an elevator calling request command to the wireless signal apparatus when the signal strength of the sensed wireless signal is equal to or greater than a corresponding trigger threshold strength.

The personal mobile terminal according to one embodiment of the present invention, wherein the personal mobile terminal is further configured to adjust and configure the corresponding trigger threshold strength according to the movement speed of the passenger carrying the personal mobile terminal.

The personal mobile terminal according to one embodiment of the present invention, wherein the personal mobile terminal is further provided with an input unit for inputting a trigger threshold strength or the elevator calling distance.

The above-mentioned features and operations of the present invention would be more obvious according to the description below and the accompanying drawings.

DESCRIPTION OF THE DRAWINGS

From the detailed description below in conjunction with the accompanying drawings, the above-mentioned and other objects and advantages of the present invention would be more complete and clearer, where the same or similar elements are denoted with the same label.

DETAILED DESCRIPTION

Figure 1:
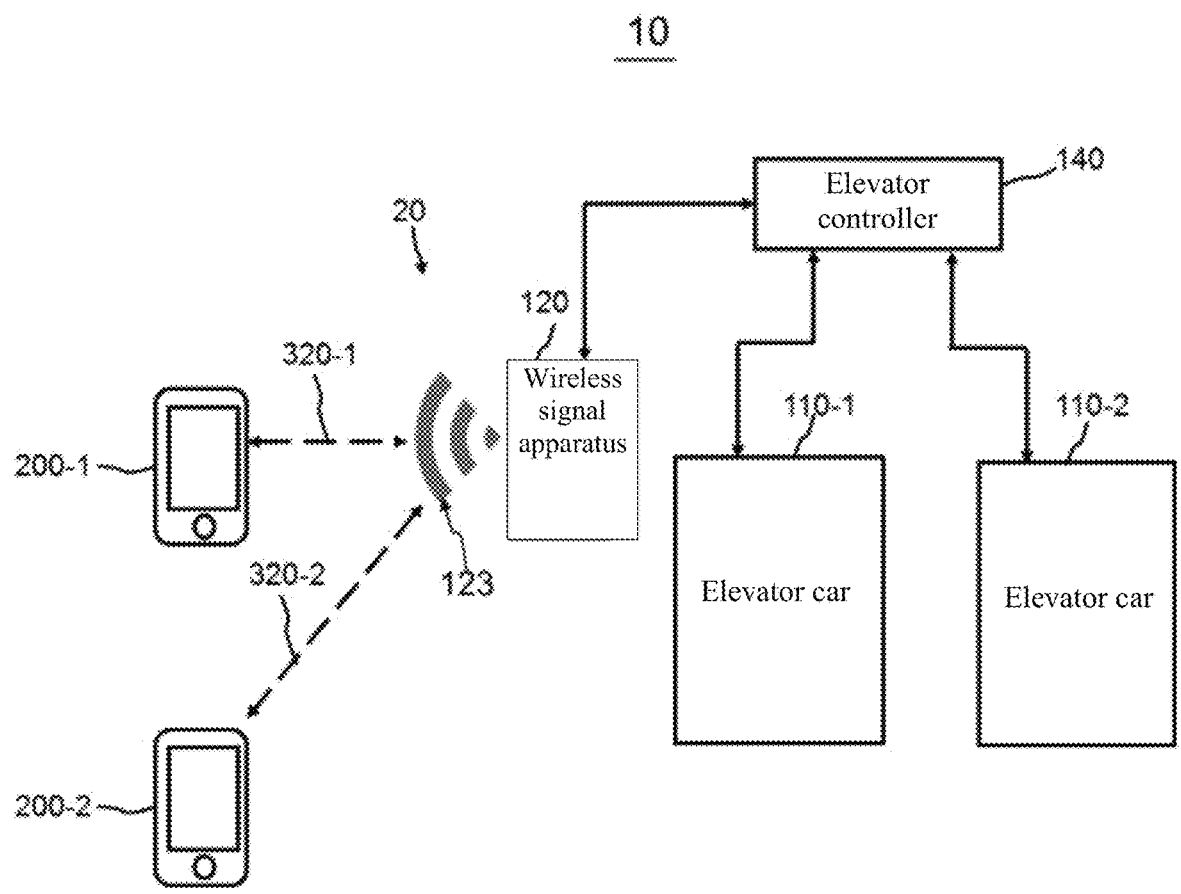
FIG. 1 is a schematic diagram of an elevator system according to one embodiment of the present invention, in which an automatic elevator-calling system according to one embodiment of the present invention is used.

The present invention will now be described more thoroughly with reference to the drawings, in which illustrative embodiments of the present invention are shown. However, the present invention can be implemented in many different ways and should not be construed as being limited to the embodiments illustrated herein. On the contrary, these embodiments are provided to make the present disclosure more thorough and complete, and fully convey the ideas of the present invention to a person skilled in the art.

Though the features of the present invention are disclosed in combination with only one of several implementation manners/embodiments, if a feature may be desirable and/or beneficial for any given or recognizable function, this feature can be combined with one or more other features of other implementation manners/embodiments.

Some block diagrams shown in the drawings are functional entities, and not necessarily corresponding to entities which are independent physically or logically. It is possible to realize these functional entities by way of software, or to realize these functional entities in one or more hardware modules or integrated circuits, or to realize these functional entities in different processing apparatuses and/or microcontroller apparatuses.

Figure 2:
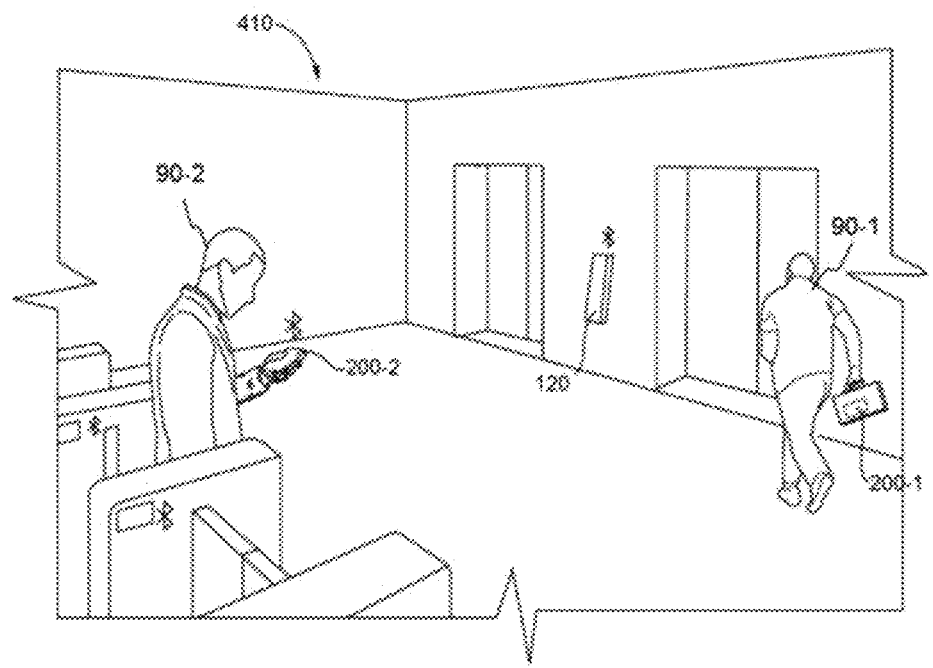
FIG. 2 is a schematic diagram of an application scenario of the elevator system according to one embodiment of the present invention.
Figure 3:
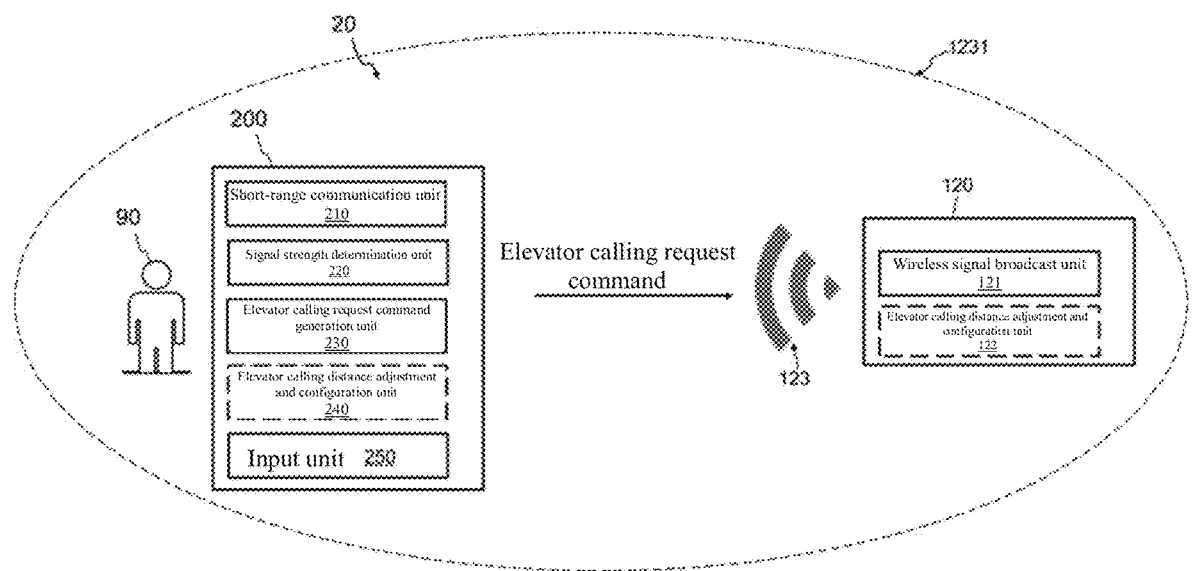
FIG. 3 is a schematic diagram of an automatic elevator-calling system according to one embodiment of the present invention, in which a wireless signal apparatus according to one embodiment of the present invention is included.

FIG. 1 shows a schematic diagram of the elevator system according to one embodiment of the present invention; FIG. 2 shows a schematic diagram of an application scenario of the elevator system according to one embodiment of the present invention; and FIG. 3 is a schematic diagram of an automatic elevator-calling system according to one embodiment of the present invention, in which a wireless signal apparatus according to one embodiment of the present invention is included. The elevator system 10, the automatic elevator-calling system 20, the personal mobile terminal 200 and the wireless signal apparatus 120 according to one embodiment of the present invention are explained in detail by way of example in conjunction with FIG. 1, FIG. 2 and FIG. 3.

The elevator system 10 according to the embodiments of the present invention can be mounted in various kinds of buildings; the elevator system 10 comprises a plurality of elevator cars 110 traveling upwards and downwards within hoistways of the building; and FIG. 1 shows two elevator cars of the elevator system, i.e., elevator cars 110-1 and 110-2. Each elevator car 110 is controlled by an elevator controller 140 in the elevator system 10 (e.g., scheduling control and traveling control), so as to travel in the hoistway or stop at the corresponding landing. Generally, the elevator controller 140 needs to acquire an elevator calling request command from an elevator landing area 410 of each floor, so as to control the running of the elevator based on the command, for example, performing scheduling control over each elevator car 110. It will be understood that the particular control mode or control principle of the one or more elevator cars 110 by the elevator controller 140 is not restrictive; and the particular structure or arrangement mode, etc. of the elevator controller 140 is not restrictive either.

In order to acquire the elevator calling request command from each elevator landing area 410, a wireless signal apparatus 120 is provided in the elevator system 10. The wireless signal apparatus 120 can be a beacon broadcasting a certain wireless signal; and the wireless signal apparatus 120 can be mounted in each elevator landing area 410 of the elevator system 10 (as shown in FIG. 2). For example, the elevator landing area 410 on each floor is mounted with at least one wireless signal apparatus 120, so that a wireless signal 123 sent out or broadcast by the wireless signal apparatus 120 can effectively approximately cover at least each elevator landing area 410.

In one embodiment, as shown in FIG. 3, the wireless signal apparatus 120 is provided with a wireless signal broadcast unit 121 for broadcasting a wireless signal 123, for example broadcasting a wireless signal with certain signal strength, so that the wireless signal 123 can cover a pre-determined range (i.e., a coverage range); the coverage range is exemplified as a range within which the personal mobile terminal can sense the wireless signal 123 (for example, a coverage range in which the signal strength is equal to or greater than 0), and therefore, the coverage range may be relevant to the signal sensing capability of each personal mobile terminal 200; generally, the coverage range can be learnt in advance through tests.

The wireless signal apparatus 120 particularly can be arranged in an elevator calling request input device of the elevator system 10 by way of integration, wherein the elevator calling request input device is generally mounted at two sides of the landing door of the elevator landing area 410; and the elevator calling request input device can also be provided with for example an "upward" or "downward" elevator calling button, so that an elevator calling request command can be manually input based on the elevator calling request input device 12. The particular arrangement manner of the wireless signal apparatus 120 with respect to the elevator calling request input device is not limited to the above-mentioned example.

Accordingly, the wireless signal 123 broadcast by the wireless signal apparatus 120 can be sensed or received by the personal mobile terminal 200. FIG. 1 shows two of the personal mobile terminals 200-1 and 200-2 by way of example, which are respectively carried by different passengers 90-1 and 90-2, and at least can be used for completing an elevator calling request operation. The personal mobile terminal 200 and the wireless signal apparatus 120 primarily form the automatic elevator-calling system 20 according to the embodiments of the present invention. When approaching the wireless signal apparatus 120 (for example, walking towards the elevator landing area 410), different passengers 90-1 and 90-2 will enter the coverage range of the wireless signal 123, and the personal mobile terminals 200 carried thereby will be able to change from being unable to sense the wireless signal 123 to being able to sense the wireless signal 123. In particular, as shown in FIG. 3, each personal mobile terminal 200 senses the wireless signal 123 via a short-range communication unit 210 provided therein, and can interact with the wireless signal apparatus 120 (e.g., establishing a wireless connection) based on the wireless signal 123 in the case where a pre-determined condition is satisfied; by way of example, the personal mobile terminal 200-1 realizes interaction 320-1 with the wireless signal apparatus 120, and the personal mobile terminal 200-2 realizes interaction 320-2 with the wireless signal apparatus 120.

The personal mobile terminal 200 can particularly be various types of smart terminals with a wireless connection function, and is convenient for a passenger to carry; for example, the personal mobile terminal 200 can be a smart cell phone, a wearable smart device (for example, a smart wristband), a personal digital assistant (PAD), and a corresponding application component (e.g., an APP) can be mounted on the personal mobile terminal 200 to realize the corresponding function of the present invention.

In one embodiment, the wireless signal apparatus 120 can be a bluetooth module and can particularly be a Bluetooth Low Energy (BLE) module. The wireless signal 123 transmitted or broadcast by the wireless signal broadcast unit 121 of the wireless signal apparatus 120 is a bluetooth signal (for example, a BLE signal), and the bluetooth signal can approximately cover the elevator landing area 410 where it is located. Accordingly, the short-range communication unit 210 of the personal mobile terminal 200 is a bluetooth communication unit, and can sense a bluetooth signal, for example, a BLE signal.

In one embodiment, the wireless signal 123 (for example, a BLE signal) can comprise a wake-up signal for waking up the personal mobile terminal 200, and the personal mobile terminal 200 having sensed the wake-up signal can wake up a corresponding application component (for example, an automatic elevator-calling APP) of the personal mobile terminal 200 to operate. The wireless signal 123 can also comprise a universal unique identifier (UUID) reflecting the identity of the wireless signal apparatus 120, and/or a data signal containing floor position information about where the wireless signal apparatus 120 is located.

In one embodiment, the strength of the wireless signal 123 attenuates with the propagation distance thereof; therefore, the personal mobile terminal 200 receiving the wireless signal 123 can approximately determine a current distance D1 between the personal mobile terminal 200 and the wireless signal apparatus 123 according to the signal strength of the wireless signal 123 sensed thereby; and it will be understood that as the passenger walks with respect to the elevator landing area 410 or walks in the elevator landing area 410, the distance D1 dynamically changes.

The personal mobile terminal 200 can particularly be provided with a signal strength determination unit 220 (as shown in FIG. 3), which can determine the signal strength of the wireless signal 123 sensed by the short-range communication unit 210, for example determining the signal strength of the sensed BLE signal.

Again, as shown in FIG. 3, the personal mobile terminal 200 is also provided with an elevator calling request command generation unit 230, which is used for generating a corresponding elevator calling request command, wherein the elevator calling request command 221 at least comprises elevator calling direction information and can also comprise at least one piece of: target floor information, elevator calling floor information and target elevator information. The elevator calling request command can be sent to the wireless signal apparatus 120 through the short-range communication unit 210 of the personal mobile terminal 200 (for example, in the personal mobile terminal 200), and thus the wireless signal apparatus 120 can transfer the elevator calling request command to the elevator controller 140. The particular form and/or particular generation manner of the elevator calling request command is not restrictive.

In one embodiment, again as shown in FIG. 3, 1231 indicates a boundary inside which the signal strength of the wireless signal 123 broadcast by the wireless signal apparatus 120 is equal to or greater than the trigger threshold strength; when the personal mobile terminal 200 enters the boundary 1231, the personal mobile terminal 200 can not only sense the wireless signal 123, but also can automatically send an elevator calling request command to the wireless signal apparatus 120; and the boundary 1231 reflects an elevator calling distance. For example, the distance between the boundary 1231 and the wireless signal apparatus 120 corresponds to the elevator calling distance, and the personal mobile terminal 200 at the boundary 1231 or inside the boundary 1231 will be able to sense the wireless signal 123 and be able to automatically send an elevator calling request command. When the personal mobile terminal 200 carried by the passenger 90 enters the boundary 1231, it can be determined that the personal mobile terminal 200 has successfully sensed the wireless signal 123 and the pre-determined condition that the signal strength is equal to or greater than the trigger threshold strength has been satisfied; and the elevator calling request command generation unit 230 of the personal mobile terminal 200 automatically generates corresponding elevator calling request command information, establishes interaction 320 (for example, establishing a bluetooth connection) with the wireless signal apparatus 120 through the short-range communication unit 210 and sends an elevator calling request command. That is to say, the personal mobile terminal 200 can automatically send a corresponding elevator calling request command to the wireless signal apparatus 120 when the signal strength of the sensed wireless signal 123 is equal to or greater than the corresponding trigger threshold strength.

Taking the application scenario shown in FIG. 2 as an example, when for example two passengers enter the elevator landing area 410 (for example, a waiting area of a lobby), the personal mobile terminal 200-1 or 200-2 (for example, a cell phone, whether in a hand or in a hand bag) carried thereby will automatically sense the wireless signal 123 broadcast by the wireless signal apparatus 120 mounted in the elevator landing area 410 (the distance of the personal mobile terminal 200-1 or 200-2 relative to the wireless signal apparatus 120 is smaller than or equal to the elevator calling distance), thereby for example establishing a bluetooth connection based on a handshake connection of the wireless signal and the wireless signal apparatus 120; the personal mobile terminal 200-1 or 200-2 automatically sends an elevator calling request command at least comprising an elevator calling direction, so as to automatically complete an elevator calling request operation; and there is no need for the passenger to manually press an elevator calling button mounted on the elevator calling request input device, and there is no need to manually operate the personal mobile 200-1 or 200-2 either.

Therefore, in the elevator system 10 according to the embodiments of the present invention, by configuring the automatic elevator calling system 20, the passenger 90 carrying the personal mobile terminal 200 can complete the elevator calling request operation automatically or in a hand-free manner, and the passenger experience with regard to the elevator calling operation of the passenger can be greatly improved.

Further, the elevator controller 140 of the elevator system 10 can be coupled with the wireless signal apparatus 120, and can at least control the running of one or more elevator cars 110 in the elevator system 10 in response to the above-mentioned elevator calling request command, for example scheduling a corresponding elevator car 110 for passengers 90-1 and 90-2 and stopping at the landing corresponding to the elevator landing area 410, for the passengers 90-1 and 90-2 to enter the elevator car 110.

The applicant has discovered that the fixation of the elevator calling distance mentioned above may bring about problems of many aspects; for example, if the elevator calling distance is too short, the personal mobile terminal 200 automatically completes elevator calling too early, and the waiting time of the passenger 90 is too long; for another example, if the elevator calling distance is too long, the personal mobile terminal 200 automatically completes the elevator calling request operation too late, and the landing door has already closed before the passenger 90 is able to enter the stopped elevator car 110. For another example, since the passenger 90-1 and the passenger 90-2 have different movement speeds (for example, the walking speeds have an obvious difference due to age difference, health state, etc.), in the case of the same elevator calling distance, after automatically completing an elevator calling request operation, it is possible that the passenger 90-1 has already moved into the corresponding elevator car 110 but the passenger 90-2 is still traveling towards the elevator car 110.

Therefore, in the automatic elevator calling system 20 according to the embodiments of the present invention, the elevator calling distance can be adjusted and configured to change, wherein the elevator calling distance indicates a corresponding distance between a personal mobile terminal 200 and a wireless signal apparatus 120 when the personal mobile terminal 200 automatically sends an elevator calling request command.

Figure 4:
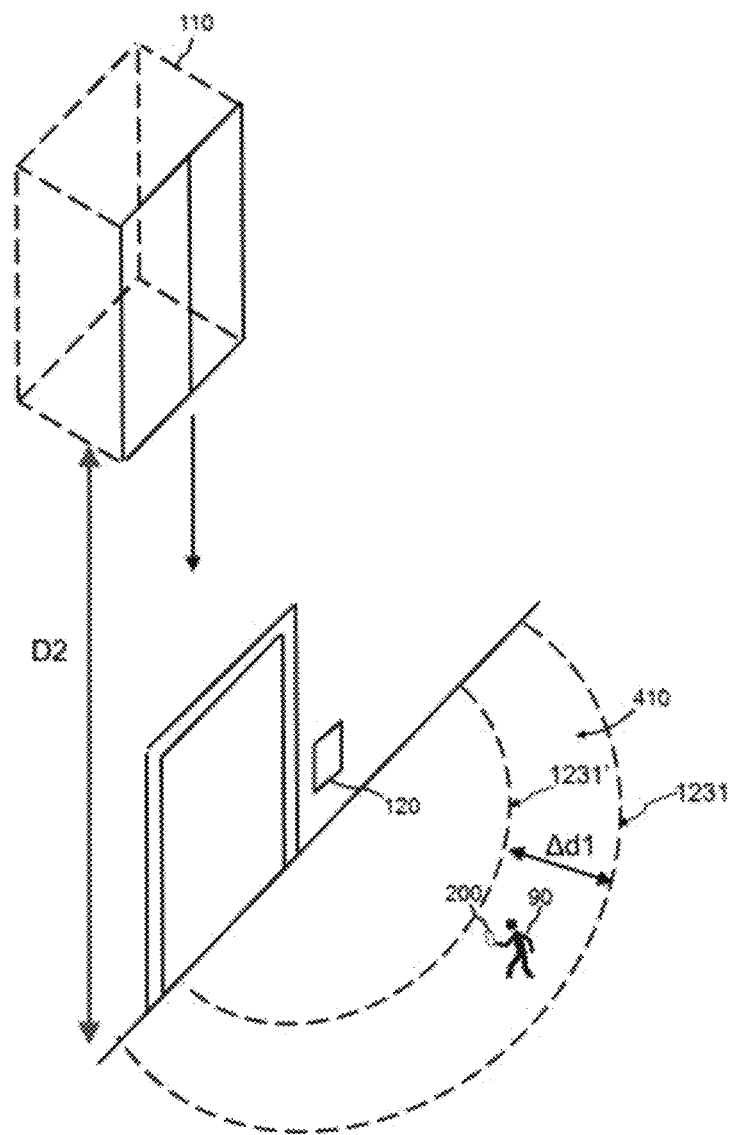
FIG. 4 is a schematic diagram of an application scenario of the automatic elevator-calling system according to one embodiment of the present invention.

In one embodiment, in conjunction with FIG. 3 and FIG. 4, for adapting to the difference in the traveling time T2 for the elevator car 110 to travel to the landing corresponding to the current elevator landing area 410, the wireless signal apparatus 120 is configured to dynamically adjust and configure the elevator calling distance according to the car traveling distance D2 for the corresponding elevator car 110 to travel to the landing where the wireless signal apparatus 120 is located. Correspondingly, the wireless signal apparatus 120 is provided with an elevator calling distance adjustment and configuration unit 122, which can receive relevant information about the car traveling distance D2 (for example, the distance for an allocated corresponding elevator car 110 to travel to the landing) from for example the elevator controller 140, and the elevator calling distance adjustment and configuration unit 122 adjusts and configures the elevator calling distance based on the car traveling distance D2. For example, if the distance D2 is longer, it indicates that the traveling time T2 that is needed for the elevator car 110 to travel to the current landing may be longer, the elevator calling distance can be configured to be larger, and the passenger 90 can automatically complete the elevator calling request earlier in the process of moving towards the elevator landing area 410, reducing the waiting time at the landing; if the distance D2 is shorter, it indicates that the traveling time T2 that is needed for the elevator car 110 to travel to the current landing may be shorter, the elevator calling distance can be configured to be smaller, and the passenger 90 can automatically complete the elevator calling request relatively later in the process of moving towards the elevator landing area 410, avoiding the case where the passenger cannot enter the elevator car 110 in time after completing the elevator calling request operation.

The wireless signal apparatus 120 particularly can adjust the elevator calling distance by adjusting the signal strength of the wireless signal 123 broadcast thereby, that is to say, dynamically adjusting and configuring the signal strength of the wireless signal 123 broadcast by the wireless signal apparatus 120 according to the car traveling distance D2 between the corresponding elevator car 110 (for example, a certain elevator car 110 to be allocated) and the wireless signal apparatus 120. Assuming that the trigger threshold strength is relatively fixed, when the signal strength of the broadcast wireless signal 123 dynamically changes, the boundary 1231 shown in FIG. 3 will dynamically change, for example expanding outwards or shrinking inwards centered on the wireless signal apparatus 120; in this way, the adjustment and configuration of the elevator calling distance is realized. In particular, the elevator calling distance adjustment and configuration unit 122 can control the strength of the wireless signal broadcast by the wireless signal broadcast unit 121 according to the current car traveling distance D2; for example, when the car traveling distance D2 is shorter, the signal strength of the wireless signal broadcast by the wireless signal broadcast unit 121 is enabled to be smaller, avoiding completing the elevator calling request too early but having no enough time to move into the stopped elevator car 110; and when the car traveling distance D2 is longer, the signal strength of the wireless signal broadcast by the wireless signal broadcast unit 121 is enabled to be greater, avoiding the case where the time for waiting for the elevator car 110 is too long as a result of the elevator calling request is completed too late. Therefore, the elevator calling experience of the passenger 90 can be greatly improved.

As shown in FIG. 4, assuming that the passenger 90 is in an elevator landing area 410 of the lobby and needs to perform upward elevator calling, and the elevator car 110 closest to the lobby landing is traveling downwards to the elevator landing area 410, the floor position information about where the elevator car 110 is currently located can be acquired from the elevator controller 140 in real time, so that the wireless signal apparatus 120 can calculate the car traveling distance D2 for the elevator car 110 to travel to the elevator landing area 410, and can approximately calculate the traveling time T2 based on the car traveling distance D2 (for example obtaining same by calculation according to historical statistic data, etc.); as the elevator car 110 travels towards the lobby landing, for example traveling from the Nth floor to the (N−M)th floor (N is an integer equal to or greater than 2, and M is an integer equal to or greater than 1), the car traveling distance D2 becomes shorter, and the wireless signal apparatus 120 controls the signal strength of the wireless signal 123 broadcast thereby to become weaker, and accordingly, the boundary 1231 shrinks to be a boundary 1231' and the elevator calling distance also correspondingly reduces by $\Delta d1$; when the elevator car 110 is at the Nth floor, the personal mobile terminal 200 of the passenger 90 illustrated in FIG. 4 can sense the wireless signal 123 and, upon entering the boundary 1231, can automatically trigger to send out an elevator calling request command; and when the elevator car 110 is at the (N−M)th floor, the personal mobile terminal 200 of the passenger 90 illustrated in FIG. 4 has not entered the updated boundary 1231', which indicates that it cannot sense the wireless signal 123 and cannot automatically trigger to send out an elevator calling request command, and the case where there is no enough time for the passenger 90 to enter the elevator car 110 that is going to stop can be avoided.

Figure 5:
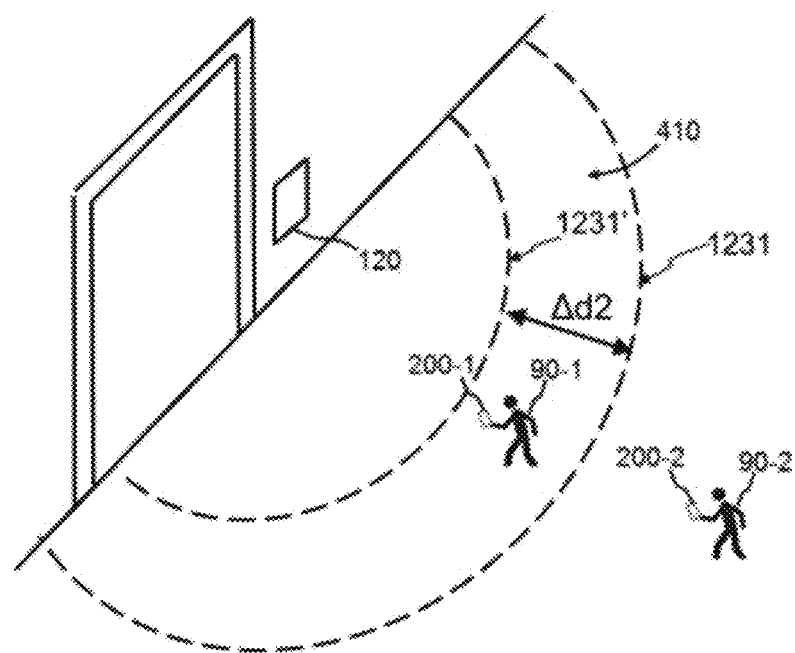
FIG. 5 is a schematic diagram of another application scenario of the automatic elevator-calling system according to one embodiment of the present invention.

In one embodiment, in conjunction with FIG. 3 and FIG. 5, for adapting to the difference in the time required for different passengers to move into the elevator landing area 410, i.e., adapting to the individual difference of the passengers 90 in terms of movement speed, the personal mobile terminal 200 carried by each passenger 90 is also configured to adjust and configure the elevator calling distance; by way of example, the personal mobile terminal 200 is also configured to adjust and configure the elevator calling distance in a personalized manner according to the movement speed V of the passenger 90 carrying the personal mobile terminal 200, and correspondingly, the personal mobile terminal 200 is optionally provided with an elevator calling distance adjustment and configuration unit 240, which can be used for determining the movement speed V of the passenger 90 and adjusting and configuring the elevator calling distance based on the movement speed V of the passenger 90.

Particularly, the personal mobile terminal 200 or the elevator calling distance adjustment and configuration unit 240 determines the movement speed V of the passenger 90 according to at least one of the following: passenger movement speed input, passenger age, passenger height, statistic information about the passenger movement speed, statistic information about historical passenger movement speed. For example, the passenger 90 can directly input passenger movement speed information through an input unit 250 of the personal mobile terminal 200; for another example, the passenger 90 directly inputs the passenger age and/or passenger height through the input unit 250 of the personal mobile terminal 200, and the elevator calling distance adjustment and configuration unit 240 can approximately calculate the movement speed of the passenger 90 according to the passenger age and/or passenger height; for still another example, a corresponding server or cloud end can be provided, to collect data relevant to the movement speed of all the passengers 90, so as to form a corresponding database; by performing data analysis on the database, for example movement speed statistic information about the passengers and/or historical movement speed statistic information about the passengers can be obtained, and the movement speed information about each passenger 90 can also be relatively accurately obtained in conjunction with information input by the passenger 90.

If the movement speed V of the passenger 90 is faster, the elevator calling distance can be configured to be larger, and the passenger 90 can automatically complete the elevator calling request at a farther place in the process of moving towards the elevator landing area 410, thereby reducing the waiting time at the landing; and if the movement speed V of the passenger 90 is slower, the elevator calling distance can be configured to be smaller, and the passenger 90 automatically completes the elevator calling request at a relatively nearer place in the process of moving towards the elevator landing area 410, avoiding the case where the passenger cannot enter the elevator car 110 in time after completing the elevator calling request operation. In the case where the movement speed V of the passenger 90 is substantially determined, if the elevator calling distance is determined, the time for the passenger 90 to approximately move to the elevator landing area 410 can be substantially calculated. In the above-mentioned process of configuring an elevator calling distance, no matter how fast the movement speeds of the passengers 90 are, the time from their personal mobile terminals 200 respectively automatically sending an elevator calling request command to having moved to the elevator landing area 410 is substantially the same.

In one embodiment, the personal mobile terminal 200 or the elevator calling distance adjustment and configuration unit 240 are configured to adjust and configure a corresponding trigger threshold strength according to the movement speed V of the passenger 90 carrying the personal mobile terminal 200, so that the boundary 1231 is different for each passenger 90, thus completing the adjustment and configuration of the elevator calling distance.

As shown in FIG. 5, assuming that the passenger 90-1 is an aged people or a child, and the movement speed thereof is slower relative to the passenger 90-2, the personal mobile terminals 200-1 and 200-2 can respectively acquire the movement speeds V1 and V2 (V1 is smaller than V2) of the passengers 90-1 and 90-2. Assuming that the signal strength of the wireless signal 123 broadcast by the wireless signal apparatus 120 does not change, or does not change in a certain period, the elevator calling distance adjustment and configuration unit 240 of the personal mobile terminal 200-2 configures the corresponding trigger threshold strength (for example relatively small), the boundary correspondingly being 1231, and the elevator calling distance adjustment and configuration unit 240 of the personal mobile terminal 200-1 configures the corresponding trigger threshold strength (for example, relatively great), the boundary correspondingly being 1231'; and when the passengers 90-1 and 90-2 move towards the wireless signal apparatus 120 at the same time, the personal mobile terminal 200-1 will sense the wireless signal 123 at a farther place and trigger to send out an elevator calling request command, and the personal mobile terminal 200-2 will sense the wireless signal 123 at a nearer place and trigger to send out an elevator calling request command. That is to say, the elevator calling distance of the personal mobile terminal 200-2 is smaller than the elevator calling distance of the personal mobile terminal 200-1 by Δd2. In this way, the length of the time periods for different passengers 90 (even though the movement speeds are different) from sending an elevator calling request command to having moved to the elevator landing area 410 tend to be consistent.

It should be noted that, in the automatic elevator calling system 20 shown in FIG. 3, the adjustment and configuration of the elevator calling distance can be realized by only providing an elevator calling distance adjustment and configuration unit 240 in the personal mobile terminal 200, and the adjustment and configuration of the elevator calling distance can also be realized by only providing an elevator calling distance adjustment and configuration unit 122 in the wireless signal apparatus 120. Of course, it is also possible to not only provide an elevator calling distance adjustment and configuration unit 240 in the personal mobile terminal 200 but also provide an elevator calling distance adjustment and configuration unit 122 in the wireless signal apparatus 120, both of which act together to configure the elevator calling distance; for example, the elevator calling distance adjustment and configuration unit 240 can configure the size of the trigger threshold strength, and at the same time, the elevator calling distance adjustment and configuration unit 122 can dynamically adjust and configure the signal strength of the wireless signal 123.

Figure 6:
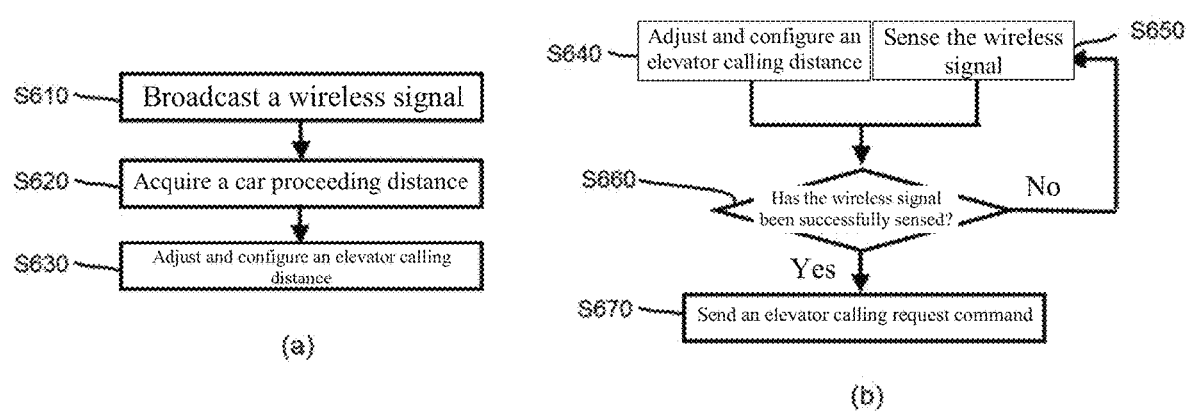
FIG. 6 is a flow chart of an automatic elevator-calling control method according to one embodiment of the present invention.

FIG. 6 is a flow chart of an automatic elevator-calling control method according to one embodiment of the present invention, wherein FIG. 6(a) illustrates a method process completed in the wireless signal apparatus, and FIG. 6(b) illustrates a method process completed in the personal mobile terminal. The automatic elevator-calling control method according to one embodiment of the present invention is explained in detail by way of example in conjunction with FIG. 1, FIG. 3 to FIG. 6.

At the end of the wireless signal apparatus 120, as shown in FIG. 6(a), in step 610, the wireless signal apparatus 120 can for example continuously broadcast a wireless signal 123. In the process of broadcasting the wireless signal, the car traveling distance D2 of the corresponding elevator car 110 traveling to the landing where the wireless signal apparatus 120 is located can also be acquired, that is step S620; in step 620, the car traveling distance D2 can be obtained by calculation according to the floor position where the elevator car 110 is currently located, the traveling direction thereof, etc., which can be completed via the elevator controller 140, and the wireless signal apparatus 120 obtains the car traveling distance D2 from the elevator controller 140.

Further, in step 630, the elevator calling distance is adjusted and configured. In this step, the elevator calling distance is dynamically adjusted and configured based on the car traveling distance D2; for example, if the distance D2 is longer, it indicates that the traveling time T2 that is needed for the elevator car 110 to travel to the current landing may be longer, the elevator calling distance can be configured to be larger, and the passenger 90 can automatically complete the elevator calling request earlier in the process of moving towards the elevator landing area 410, reducing the waiting time at the landing; if the distance D2 is shorter, it indicates that the traveling time T2 that is needed for the elevator car 110 to travel to the current landing may be shorter, the elevator calling distance can be configured to be smaller, and the passenger 90 can automatically complete the elevator calling request relatively later in the process of moving towards the elevator landing area 410, avoiding the case where the passenger cannot enter the elevator car 110 in time after completing the elevator calling request operation.

Particularly, the elevator calling distance can be adjusted by adjusting and configuring the signal strength of the wireless signal 123 broadcast in step S610, that is to say, dynamically adjusting and configuring the signal strength of the wireless signal 123 broadcast by the wireless signal apparatus 120 according to the car traveling distance D2 between the corresponding elevator car 110 (for example, a certain elevator car 110 to be allocated) and the wireless signal apparatus 120. Assuming that the trigger threshold strength is relatively fixed, when the signal strength of the broadcast wireless signal 123 dynamically changes, if the boundary 1231 shown in FIG. 3 will dynamically change, for example expanding outwards or shrinking inwards centered on the wireless signal apparatus 120; in this way, the adjustment and configuration of the elevator calling distance is realized. For example, when the car traveling distance D2 is shorter, the signal strength of the wireless signal broadcast by the wireless signal broadcast unit 121 is enabled to be smaller, avoiding completing the elevator calling request too early but not having enough time to move into the stopped elevator car 110; and when the car traveling distance D2 is longer, the signal strength of the wireless signal broadcast by the wireless signal broadcast unit 121 is enabled to be greater, avoiding the case where the time for waiting for the elevator car 110 is too long as a result of the elevator calling request is completed too late.

Therefore, the automatic elevator-calling control method of step S610 to step S630 can greatly improve the elevator calling experience of the passenger 90.

At the end of the personal mobile terminal 200, as shown in FIG. 6(b), in step S640, the elevator calling distance is adjusted and configured. In this step, the passenger 90 can directly adjust and configure the elevator calling distance by way of input, and can also adjust and configure the corresponding elevator calling distance according to the movement speed V of the passenger 90 carrying the personal mobile terminal 200, wherein the movement speed V of the passenger 90 is determined particularly according to one or more of: passenger movement speed input, passenger age, passenger height, statistic information about the passenger movement speed, statistic information about historical passenger movement speed. For example, the passenger 90 can directly input passenger movement speed information through an input unit 250 of the personal mobile terminal 200; for another example, the passenger 90 directly inputs the passenger age and/or passenger height through the input unit 250 of the personal mobile terminal 200, and the elevator calling distance adjustment and configuration unit 240 can approximately calculate the movement speed of the passenger 90 according to the passenger age and/or passenger height; for still another example, a corresponding server or cloud end can be provided, to collect data relevant to the movement speed of all the passengers 90, so as to form a corresponding database; by performing data analysis on the database, for example movement speed statistic information about the passengers and/or historical movement speed statistic information about the passengers can be obtained, and the movement speed information about each passenger 90 can also be relatively accurately obtained in conjunction with information input by the passenger 90.

In step S640, if the movement speed V of the passenger 90 is faster, the elevator calling distance can be configured to be larger, and the passenger 90 can automatically complete the elevator calling request at a farther place in the process of moving towards the elevator landing area 410, thereby reducing the waiting time at the landing; and if the movement speed V of the passenger 90 is slower, the elevator calling distance can be configured to be smaller, and the passenger 90 automatically completes the elevator calling request at a relatively nearer place in the process of moving towards the elevator landing area 410, avoiding the case where the passenger cannot enter the elevator car 110 in time after completing the elevator calling request operation. In the case where the movement speed V of the passenger 90 is substantially determined, if the elevator calling distance is determined, the time for the passenger 90 to approximately move to the elevator landing area 410 can be substantially calculated. In the above-mentioned process of configuring an elevator calling distance, no matter how fast the movement speeds of the passengers 90 are, the time from their personal mobile terminals 200 respectively automatically sending an elevator calling request command to having moved to the elevator landing area 410 is substantially the same.

In step S640, a corresponding trigger threshold strength can be adjusted and configured according to the movement speed V of the passenger 90 carrying the personal mobile terminal 200, so that the boundary 1231 as shown in FIG. 3 is different for each passenger 90, completing the adjustment and configuration of the elevator calling distance. In a further alternative embodiment, a time point of delaying the sending of an elevator calling request command is adjusted and configured according to the movement speed V of the passenger 90 carrying the personal mobile terminal 200; for example, if the movement speed of the passenger is relatively slow, an elevator calling request command is triggered to be generated at the boundary 1231 but is not immediately sent, but instead, the elevator calling request command is sent after the delay of a corresponding time period, the delayed time period being determined according to the movement speed. it will be understood that the delayed time period in fact corresponds to a movement distance in the time period under the movement speed; for the passenger with a relatively slow movement speed, the elevator calling distance in fact reduces the movement distance corresponding to the delayed time period; and the above-mentioned method of delaying the sending time is also a particular example of adjusting and configuring the elevator calling distance in essence.

At the same time, in step S650, the personal mobile terminal 200 senses the wireless signal 123, and the signal strength of the sensed wireless signal 123 can be calculated in real time.

Further, in step S660, whether the wireless signal 123 has been successfully sensed is judged. In one embodiment, whether the wireless signal 123 has been successfully sensed is judged based on the trigger threshold strength; for example, if the signal strength of the sensed wireless signal 123 is equal to or greater than the trigger threshold strength, then it corresponds to the passenger 90 reaching the boundary 1231, and the judgement result is "yes", the generation of an elevator calling request command is automatically triggered and the elevator calling request command is sent to the wireless signal apparatus 120, i.e., step S670; otherwise, the judgement result is "no", and step S650 is returned to.

In this way, the length of the time periods for different passengers 90 (even though the movement speeds are different) from sending an elevator calling request command to having moved to the elevator landing area 410 tend to be consistent.

It should be noted that the personal mobile terminal 200 according to the above-mentioned embodiments of the present invention can be implemented by computer program instructions, for example, implemented by a dedicated APP. These computer program instructions can be provided to a processor of a general-purpose computer, of a special-purpose computer or of other programmable data processing devices to construct the personal mobile terminal 200 according to the embodiments of the present invention; and the processor of the computer or other programmable data processing devices can execute these instructions to create a unit or component for implementing a specified function/operation in these flow charts and/or blocks and/or one or more flow block diagrams.

In the same way, the wireless signal apparatus 120 of the elevator system 10 according to the above-mentioned embodiments of the present invention can be implemented by computer program instructions, for example, implemented by a special-purpose program, and these computer program instructions can be provided to the processor to construct the control module 300 of the embodiments of the present invention; and the processor of the computer or other programmable data processing devices can execute these instructions to create a unit or component for implementing a specified function/operation in these flow charts and/or blocks and/or one or more flow block diagrams.

Moreover, these computer program instructions can be stored in a computer readable memory, and these instructions can instruct a computer or other programmable processors to implement a function in a specific way, so that these instructions stored in the computer readable memory construct a fabricated product containing an instruction component implementing a specified function/operation in one or more blocks of a flow chart and/or block diagram.

It should also be noted that, in some alternative implementation manners, the functions/operations shown in the blocks may not happen in the sequence shown in the flowchart. For example, two blocks successively shown can be executed substantially at the same time in fact, or these blocks can be executed in a reversed order sometimes, depending on the involved function/operation in particular.

It should be noted that the elements (including the flow charts and block diagrams in the accompanying drawings)

disclosed and described herein refer to logical boundaries between elements. However, according to software or hardware program practices, the described elements and functions thereof can be executed on a machine through a computer executable medium; the computer executable medium has a processor capable of executing program instructions stored thereon; and the program instructions act as a single-chip software structure, as an independent software module or as a module using external programs, codes, services, etc., or as any combination of these, and all of these execution solutions can fall within the scope of the present disclosure.

Even though different non-restrictive implementation manners have specifically described components, the implementation manners of the present invention are not limited to these specific combinations. Some of components or features from any non-restrictive implementation manners can be used in combination with features or components from any other non-restrictive implementation manners.

Although a specific step sequence is shown, disclosed and claimed, it should be understood that the steps can be implemented in any order, separated or combined, and will still benefit from the present disclosure, unless otherwise specified.

The description above is exemplary but is not defined to be limited thereto. Various non-restrictive implementation manners are disclosed here; however, a person of ordinary skill in the art will realize that, according to the teachings above, various modifications and changes will fall within the scope of the appended claims. Therefore, it will be understood that, within the scope of the appended claims, the disclosure other than a specific disclosure can be embodied. For this reason, the real range and contents should be determined by studying the appended claims.

What is claimed is:

1. A wireless signal apparatus mounted in an elevator landing area of an elevator system and the wireless signal apparatus broadcasts a corresponding wireless signal to the surroundings, wherein the wireless signal apparatus is configured to adjust and configure an elevator calling distance according to a car traveling distance for a corresponding elevator car to travel to a landing where the wireless signal apparatus is located, and the elevator calling distance indicates a distance between a personal mobile terminal that can sense the wireless signal and the wireless signal apparatus when the personal mobile terminal automatically sends an elevator calling request command.

2. The wireless signal apparatus as claimed in claim 1, wherein the wireless signal apparatus is configured to adjust and configure a signal strength of the wireless signal broadcast thereby according to the car traveling distance between the corresponding elevator car and the wireless signal apparatus.

3. The wireless signal apparatus as claimed in claim 1, wherein the wireless signal apparatus is configured to enable a signal strength of the wireless signal broadcast thereby to be smaller when the car traveling distance is shorter.

4. The wireless signal apparatus as claimed in claim 1, wherein the wireless signal apparatus is a bluetooth module or a bluetooth low energy module, and the wireless signal is a bluetooth signal or a bluetooth low energy signal.

5. An automatic elevator-calling control method comprising:
adjusting and configuring an elevator calling distance, wherein the elevator calling distance indicates a distance between a personal mobile terminal and a wireless signal apparatus mounted in an elevator landing area of an elevator system in response to the personal mobile terminal automatically sends an elevator calling request command; and
an elevator calling operation in response to the distance between the personal mobile terminal and the wireless signal apparatus is smaller than or equal to the configured elevator calling distance, an elevator calling operation of automatically sending and/or receiving an elevator calling request command is performed.

6. The automatic elevator-calling control method as claimed in claim 5, wherein in the adjusting and configuring the elevator calling distance, the elevator calling distance is adjusted and configured according to a car traveling distance for a corresponding elevator car to travel to a landing where the wireless signal apparatus is located.

7. The automatic elevator-calling control method as claimed in claim 6, wherein in the adjusting and configuring the elevator calling distance, a signal strength of the wireless signal broadcast by the wireless signal apparatus is adjusted and configured according to the car traveling distance for the corresponding elevator car to travel to the landing where the wireless signal apparatus is located.

8. The automatic elevator-calling control method as claimed in claim 7, wherein in the adjusting and configuring the elevator calling distance, the signal strength of the wireless signal broadcast by the wireless signal apparatus is enabled to be smaller when the car traveling distance is shorter.

9. The automatic elevator-calling control method as claimed in claim 5, wherein in the adjusting and configuring the elevator calling distance, the elevator-calling distance is adjusted and configured according to a movement speed of a passenger carrying the personal mobile terminal.

10. The automatic elevator-calling control method as claimed in claim 9, wherein in the adjusting and configuring the elevator calling distance, the movement speed is determined according to at least one of the following: passenger movement speed input, passenger age, passenger height, statistic information about the passenger movement speed, statistic information about historical passenger movement speed.

11. The automatic elevator-calling control method as claimed in claim 5, wherein the elevator calling operation comprises:
sensing a wireless signal broadcast by the wireless signal apparatus; and
automatically sending an elevator calling request command to the wireless signal apparatus when the wireless signal is sensed.

12. The automatic elevator-calling control method as claimed in claim 11, wherein the distance between the personal mobile terminal and the wireless signal apparatus is approximately determined according to a signal strength of the sensed wireless signal.

13. The automatic elevator-calling control method as claimed in claim 11, wherein the elevator calling operation comprises:
determining a signal strength of the sensed wireless signal and judging whether the signal strength is equal to or greater than a corresponding trigger threshold strength; and
automatically sending an elevator calling request command to the wireless signal apparatus when the signal strength of the sensed wireless signal is equal to or greater than the corresponding trigger threshold strength.

14. The automatic elevator-calling control method as claimed in claim 13, wherein in the adjusting and configuring the elevator-calling distance, the corresponding trigger threshold strength is adjusted and configured according to a movement speed of a passenger carrying the personal mobile terminal.

15. The automatic elevator-calling control method as claimed in claim 13, further comprising receiving an input regarding the trigger threshold strength or the elevator calling distance.

16. A wireless signal apparatus comprising a memory, a processor and a computer program stored on the memory and capable of running on the processor, characterized in that the processor can implement the following steps while executing the program:
- adjusting and configuring an elevator calling distance, wherein the elevator calling distance indicates a distance between a personal mobile terminal and a wireless signal apparatus mounted in an elevator landing area of an elevator system in response to the personal mobile terminal automatically sends an elevator calling request command; and
- an elevator calling operation in response to the distance between the personal mobile terminal and the wireless signal apparatus is smaller than or equal to the elevator calling distance, an elevator calling operation of receiving the elevator calling request command is performed.

17. A non-transitory computer readable storage medium with a computer program stored thereon, characterized in that the program can be executed by a processor to implement the steps of the automatic elevator-calling control method as claimed in claim 5.

* * * * *